United States Patent [19]

Kawamura

[11] Patent Number: 4,894,991
[45] Date of Patent: Jan. 23, 1990

[54] CONTROL SYSTEM FOR INTERNAL COMBUSTION ENGINE WITH TURBOCHARGER

[75] Inventor: Hideo Kawamura, Kanagawa, Japan

[73] Assignee: Isuzu Motors Limited, Tokyo, Japan

[21] Appl. No.: 291,267

[22] Filed: Dec. 28, 1988

[30] Foreign Application Priority Data

Dec. 28, 1987 [JP] Japan .................. 62-335121

[51] Int. Cl.$^4$ ........................... F02B 37/14
[52] U.S. Cl. .................................... 60/608
[58] Field of Search ............ 60/607, 608; 290/52

[56] References Cited

U.S. PATENT DOCUMENTS 4,745,755 5/1988 Kawamura ............... 60/608
4,833,887 5/1989 Kawamura et al. ........... 60/608

FOREIGN PATENT DOCUMENTS 3539782 5/1987 Fed. Rep. of Germany ........ 60/608

Primary Examiner—Michael Koczo
Attorney, Agent, or Firm—Staas & Halsey

[57] ABSTRACT

A control system for an internal combustion engine having a turbocharger determines an amount of air commensurate with an amount of fuel to be supplied which corresponds to the degree of depression of an accelerator pedal, based on the rotational speed of the engine and the degree of depression of the accelerator pedal. If a value produced by subtracting an amount of air downstream of a throttle valve from the commensurate amount of air is larger than a predetermined value, than an electric rotary machine combined with the turbocharger is operated as a motor to increase the amount of air supplied to the engine, and an amount of fuel corresponding to the supplied amount of air is supplied to the engine.

3 Claims, 3 Drawing Sheets

CONTROL SYSTEM FOR INTERNAL COMBUSTION ENGINE WITH TURBOCHARGER

BACKGROUND OF THE INVENTION

The present invention relates to a control system for an internal combustion engine having a turbocharger drivable by the energy of exhaust gases emitted from the engine, and more particularly to a control system for an internal combustion engine, especially a gasoline engine, having a turbocharger combined with an electric rotary machine serving as a motor-generator mounted on the rotatable shaft of the turbocharger.

Japanese Laid-Open Patent Publication No. 60-195329 discloses an engine system in which an electric rotary machine operable as a motor or a generator is mounted on the rotatable shaft of a turbocharger drivable by the energy of exhaust gases emitted from an engine, and the electric rotary machine is operated as a motor or a generator dependent on operating conditions of the engine.

According to the disclosed arrangement, when the engine rotates at a low speed and under a high load, the electric rotary machine is operated as a motor to assist in turbocharging the engine. With a gasoline engine, unlike a diesel engine, the boost pressure produced by the turbocharger is increased up to a region upstream of a throttle valve. When the engine is under a partial load, however, the opening of the throttle valve is reduced, and the pressure near an intake valve is made lower than the atmospheric pressure.

In case the electric rotary machine is operated as a motor with the turbocharged boost pressure used as a reference, since the pressure of intake air supplied to the engine is low, no optimum engine output power is available when the engine is partially loaded.

SUMMARY OF THE INVENTION

It is an object of the present invention to provide a control system for an internal combustion engine having a turbocharger, the control system being capable of supplying the engine with an amount of air commensurate with a supplied amount of fuel corresponding to the amount of depression of an accelerator pedal, even when the engine is under a partial load, so that engine output power corresponding to the degree of depression of the accelerator pedal, which represents the intention of the driver for acceleration or deceleration, can be produced.

According to the present invention, there is provided a control system for an internal combustion engine having a turbocharger, comprising: an electric rotary machine disposed on a rotatable shaft of said turbocharger; an accelerator pedal position sensor for detecting the degree of depression of an accelerator pedal which controls operation of the engine; an engine speed sensor for detecting the speed of rotation of said engine; an amount-of-air sensor for detecting the amount of air downstream of a throttle valve disposed in an intake pipe connected to said engine; means for calculating an amount of air commensurate with an amount of fuel to be supplied which corresponds to the degree of depression of the accelerator pedal, based on detected signals from said engine speed sensor and said accelerator pedal position sensor; means for calculating electric power to be supplied to said electric rotary machine, which corresponds to the difference between said commensurate amount of air and the amount of air detected by said amount-of-air sensor, when a value produced by subtracting the amount of air detected by said amount-of-air sensor from said commensurate amount of air is larger than a predetermined value; means for supplying the calculated electric power to said electric rotary machine; means for calculating an amount of fuel to be supplied which corresponds to the amount of air detected by said amount-of-air sensor, after said electric rotary machine is operated; and means for supplying said engine with said calculated amount of fuel.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
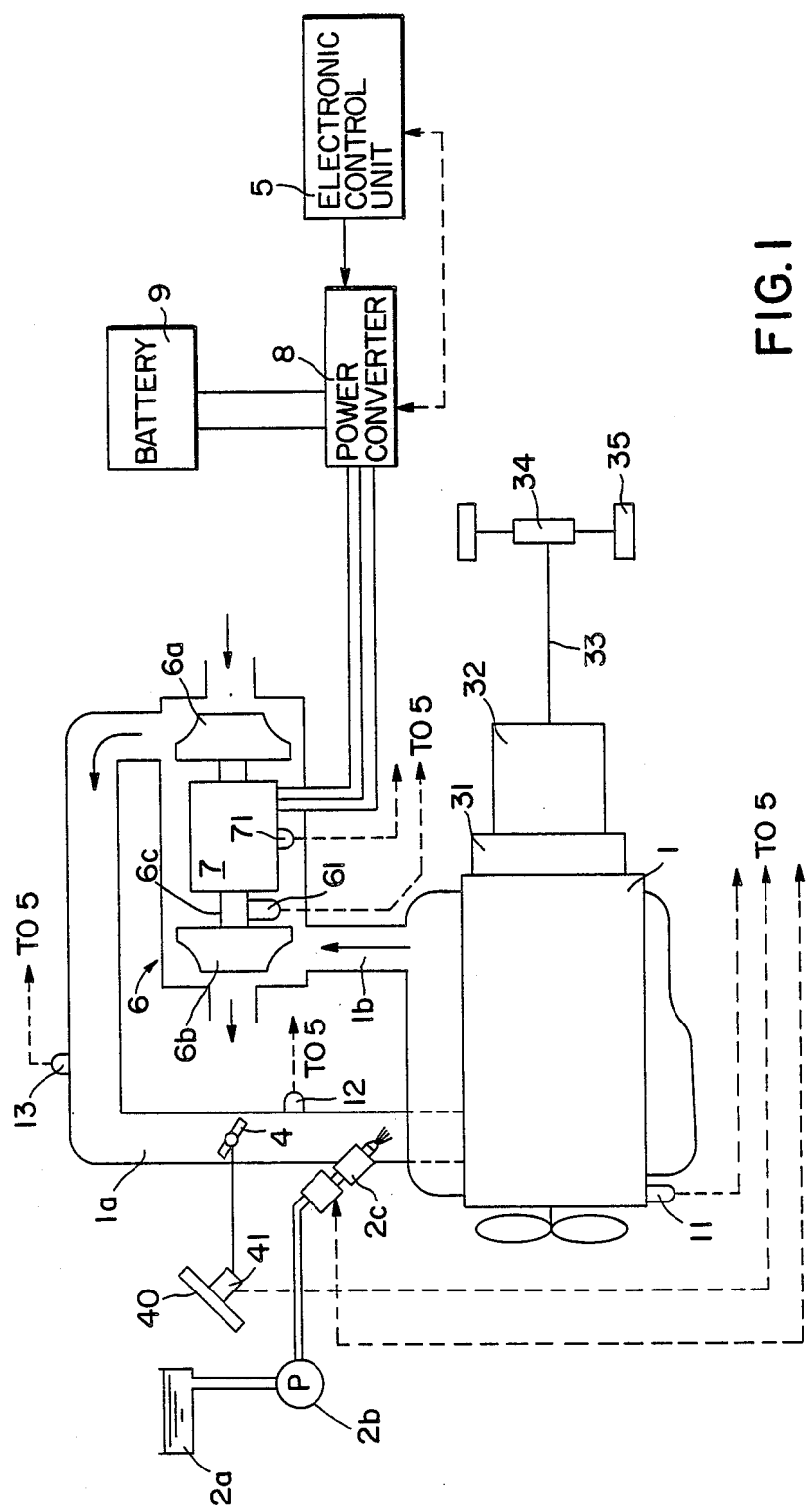
FIG. 1 is a schematic view, partly in block form, of a control system according to the present invention.

As shown in FIG. 1, an internal combustion engine 1 using gasoline as fuel produces combustion energy by burning fuel supplied from a fuel tank 2a through a fuel pump 2b and an injector 2c and mixed with air drawn through an intake pipe 1a, and discharges exhaust gases through an exhaust pipe 1b.

Power generated by the combustion energy produced by the engine 1 is transmitted through a clutch 31, a transmission 32, a propeller shaft 33, and a final speed reducer 34 to road wheels 35 to drive a motor vehicle on which the engine 1 is mounted.

The rotational speed of the engine 1 is detected by an engine speed sensor 11, which sends a detected signal to an electronic control unit 5.

A throttle valve 4 is disposed in the intake pipe 1a and operated by an accelerator pedal 40.

The degree of depression of the accelerator pedal 40 is detected by an accelerator pedal position sensor 41, which issues a detected signal to the electronic control unit 5.

A turbocharger 6 is coupled to the intake pipe 1b and the exhaust pipe 1a and has a turbine 6b drivable by the energy of exhaust gases emitted from the engine 1 and a compressor 6a rotatable by the turbine 6b for charging intake air into the engine 1. The turbine 6b and the compressor 6a are interconnected by a rotatable shaft 6c on which there is mounted an electric rotary machine 7 that can selectively operate as a motor or a generator. When the turbine 6b is rotated by the exhaust energy, the electric rotary machine 7 operates in a generator mode to generate electric power which is sent to a power converter 8 that charges a battery 9 mounted on the motor vehicle.

The power converter 8 comprises various power control circuits such as a rectifying/smoothing circuit for converting AC electric power to DC electric power, a converter circuit for freely varying the voltage of the DC electric power, an inverter circuit for inverting the DC electric power to AC electric power with adjustable frequency, and a duty cycle control circuit having semiconductor devices for controlling the voltage and current of the electric power. These various power control circuits are controlled by control commands from the electronic control unit 5. For increasing the output torque from the engine 1, the DC electric power from the battery 9 is converted to AC electric power, which is supplied to the electric rotary machine 7. The electric rotary machine 7 then operates in a motor mode to drive the compressor 6a for compressing intake air, thus increasing the boost pressure of intake air to be charged into the engine 1.

An amount-or-air sensor 12 is attached to the intake pipe 1a downstream of the throttle valve 4 for detecting the amount of air supplied to the engine 1. A boost pressure sensor 13 is mounted on the intake pipe 1a upstream of the throttle valve 4. Detected signals from the sensors 12, 13 are supplied to the electronic control unit 5.

The rotational speed of the rotatable shaft 6c of the turbocharger 6 is detected by a turbine speed sensor 61, and the phase of the magnetic field and the output of the rotor of the electric rotary machine 7 is detected by a phase sensor 71. Detected signals from the sensors 61, 71 are also applied to the electronic control unit 5.

The electronic control unit 5 comprises a microcomputer having a central processing unit for effecting arithmetic operation on signals from the various sensors and comparing coefficients, memories for storing a control program and various data, and an input/output unit for receiving various signals and transmitting control commands. The electronic control unit 5 issues commands for controlling the amount of fuel supplied from the injector 2c to the engine 1, the output power of the power converter 8, and the voltage generated by the electric rotary machine 7. The memories of the electronic control unit 5 store amounts of air to be supplied which are commensurate with amounts of fuel supplied corresponding to amounts of depression of the accelerator pedal 40, engine rotational speed data corresponding to amounts of depression of the accelerator pedal 40, and maps of these data.

Figure 2A:
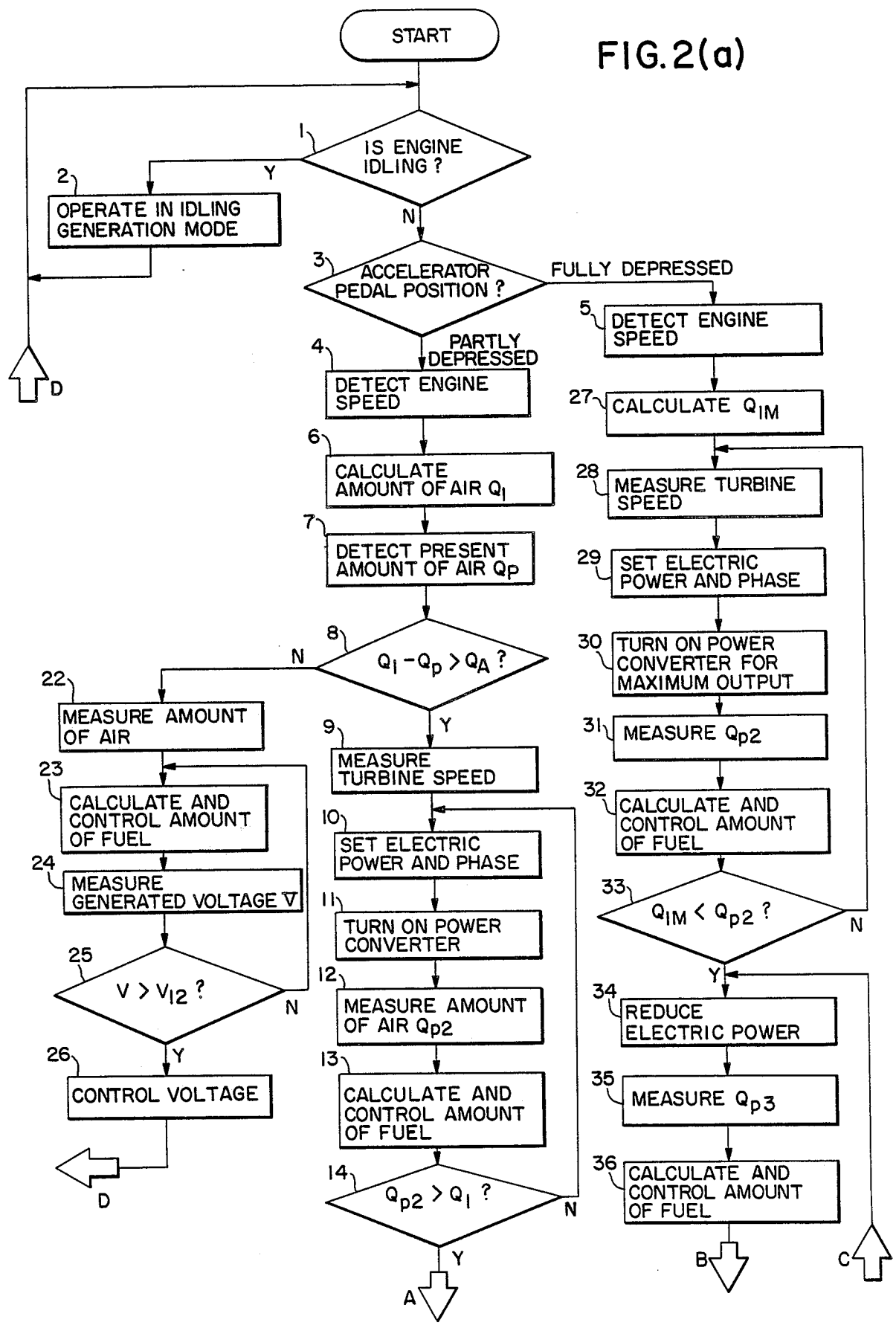
FIGS. 2(a) and 2(b) are a flowchart showing an operation sequence of the control system.
Figure 2B:
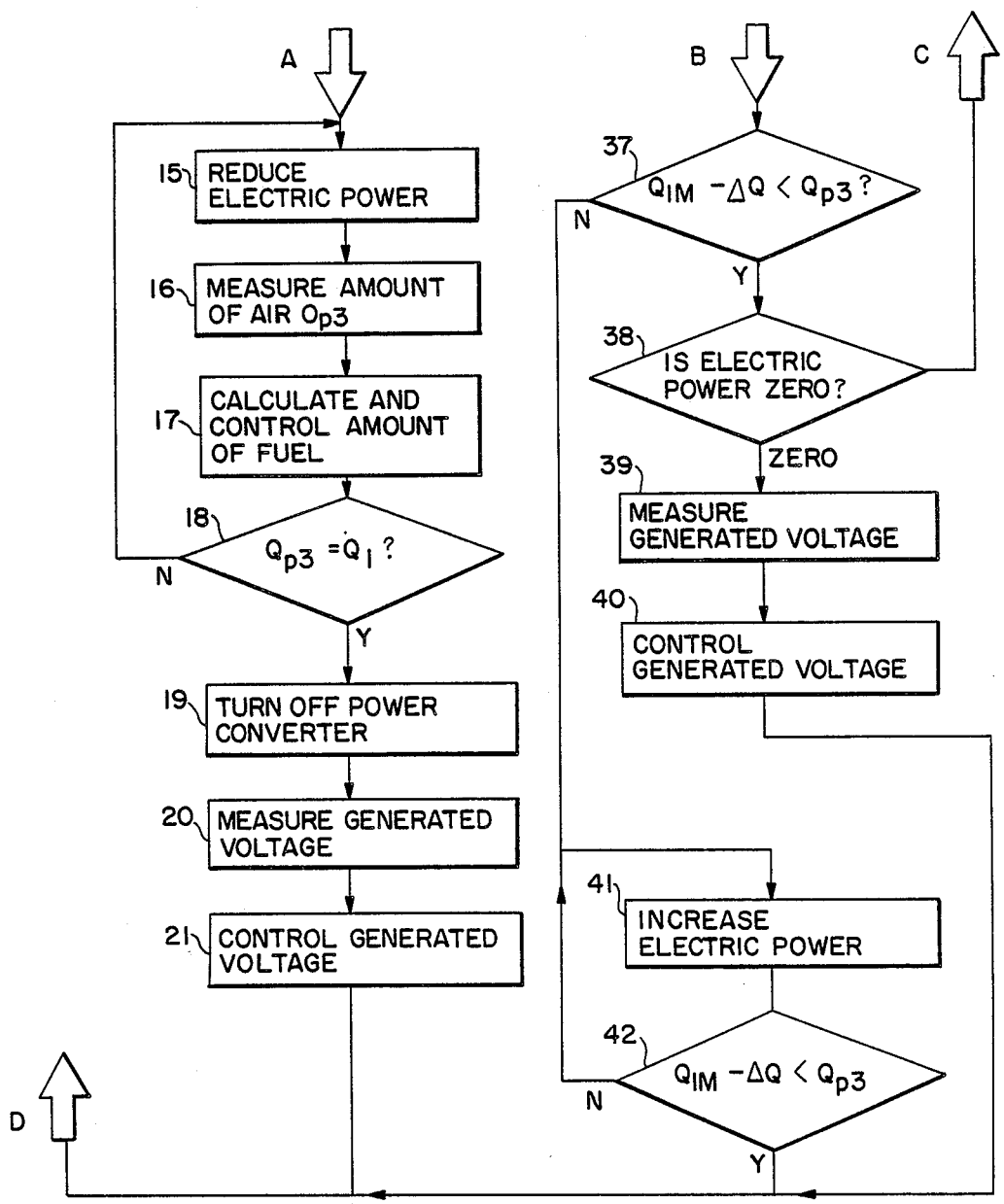

Operation of the control system will now be described below with reference to the flowchart of FIGS. 2(a) and 2(b).

A step 1 determines whether the engine 1 is idling or not based on a speed signal from the engine speed sensor 11. If the engine speed is an idling speed, then control goes to a step 2 in which the electric rotary machine 7 is operated in an idling generation mode.

If the engine speed is not an idling speed in the step 1, then a signal from the accelerator pedal movement sensor 41 is checked in a step 3. If the accelerator pedal 40 is fully depressed, then control goes to a step 5, and if the accelerator pedal 40 is partly depressed, then control goes to a step 4.

In the step 4, the engine rotational speed is detected by the engine speed sensor 11. Then, an amount of air $(Q_1)$ to be burned at a proper air/fuel ratio commensurate with an amount of fuel supplied which corresponds to the degree of depression of the accelerator pedal 40 is calculated in a step 6. A present amount of air $(Q_P)$ is then detected based on a signal from the amount-of-air sensor 12 in a step 7.

A step 8 compares the difference $(Q_1 - Q_P)$ between the amount of air $(Q_1)$ and the amount of air $(Q_P)$ and a predetermined amount of air $(Q_A)$. If $(Q_1 - Q_P) > (Q_A)$, then it is determined that the engine 1 should be accelerated, and the turbine rotational speed is measured based on a signal from the turbine speed sensor 61 in a step 9. In a next step 10, the electric power to be supplied and the phase thereof are set which correspond to the difference between the amount of air $(Q_1)$ and the present amount of air $(Q_P)$. The inverter of the power converter 8 is controlled to drive the electric rotary machine 7 in a step 11.

In a step 12, the amount of air $(Q_{P2})$ is measured based on a signal from the amount-of-air sensor 12. In a step 13, the amount of fuel to be supplied which corresponds to the amount of air $(Q_{P2})$ is calculated, and the injector 2c is controlled to supply the calculated amount of fuel into the engine 1.

A step 14 then compares the amount of air $(Q_{P2})$ with the amount of air $(Q_1)$ corresponding to the degree of depression of the accelerator pedal 40. If $(Q_{P2}) > (Q_1)$, then the electric power supplied to the electric rotary machine 7 is reduced in a step 15, and the amount of air $(Q_{P3})$ is measured based on a signal from the amount-of-air sensor 12 in a step 16. The amount of fuel to be supplied which corresponds to the amount of air $(Q_{P3})$ is calculated and the injector 2c is controlled in a step 17.

A step 18 determines whether the amount of air $(Q_{P3})$ is equal to the amount of air $(Q_1)$. If equal, then the power converter 8 is turned off in a step 19, the voltage generated by the electric rotary machine 7 is measured in a step 20, and the generated voltage is controlled in a step 21.

If $(Q_1 - Q_P) < (Q_A)$ in the step 8, then it is determined that the engine is in a steady mode, and control goes to a step 22 in which the amount of air is measured based on a signal from the amount-of-air sensor 12. In a next step 23, the amount of fuel to be supplied which corresponds to the measured amount of air is calculated and the injector 2c is controlled. Then, the voltage generated by the electric rotary machine 7 is measured in a step 24. If the measured voltage is higher than a predetermined voltage, e.g., 12 V, in a step 25, then the generated voltage is controlled in a step 26.

If the accelerator pedal 40 is fully depressed in the step 3, the engine rotational speed is detected by the engine speed sensor 11 in the step 5. Then, an amount of air $(Q_{1M})$ corresponding to a proper air/fuel ratio for the amount of fuel to be supplied which corresponds to the full depression of the accelerator pedal 40 is calculated in a step 27.

Then, the steps 28 through 32 effect the same processing as that in the steps 9 through 13, and a step 33 compares the amount of air $(Q_{1M})$, and the amount of air $(Q_{P2})$.

If the measured amount of air $(Q_{P2})$ is larger than the amount of air $(Q_{1M})$, then the electric power supplied from the power converter 8 is reduced in a step 34, and the amount of air $(Q_{P3})$ is measured based on a signal from the amount-or-air sensor 12 in a step 35. The amount of fuel to be supplied which corresponds to the amount of air $(Q_{P3})$ is calculated and controlled in a step 36.

A step 37 compares the difference $(Q_{1M} - \Delta Q)$ which is produced by subtracting a small amount $\Delta Q$ from the amount of air $(Q_{1M})$ with the measured amount of air $(Q_{P3})$. If $(Q_{P3}) > (Q_{1M} - \Delta Q)$, then the electric power supplied to the electric rotary machine 7 is checked in a step 38. If the supplied amount of electric power is zero, then the voltage generated by the electric rotary machine 7 is measured in a step 39 and controlled in a step 40. If the supplied amount of electric power is not zero in the step 38, then control returns to the step 34.

If the amount of air ($Q_{P3}$) is smaller than ($Q_{1M}-\Delta Q$) in the step 37, the electric power supplied to the electric rotary machine 7 is increased in a step 41, and then ($Q_{1M}-\Delta Q$) and ($Q_{P3}$) are compared in a step 42. If the amount of air ($Q_{P3}$) is smaller than ($Q_{1M}\Delta Q$), then the electric power supplied from the power converter 8 is increased again in the step 41.

With the present invention, as described above, the amount of air commensurate with the amount of fuel supplied which corresponds to the degree of depression of the accelerator pedal is determined on the basis of the engine rotational speed and the degree of depression of the accelerator pedal. If the value produced by subtracting the amount of air downstream of the throttle valve from the determined amount of air is larger than a predetermined value, then the electric rotary machine combined with the turbocharger is operated as a motor to increase the amount of air to be charged into the engine, and the amount of fuel corresponding to the supplied amount of air is controlled. Therefore, engine output power corresponding to the degree of depression of the accelerator pedal, which indicates the intention of the driver for accelerator or deceleration, can be produced even when the engine is under a partial load.

Although a certain preferred embodiment has been shown and described, it should be understood that many changes and modifications may be made therein without departing from the scope of the appended claims.

What is claimed is:

1. A control system for an internal combustion engine having a turbocharger, comprising:
    an electric rotary machine disposed on a rotatable shaft of said turbocharger;
    an accelerator pedal position sensor for detecting the degree of depression of an accelerator pedal which controls operation of the engine;
    an engine speed sensor for detecting the speed of rotation of said engine;
    an amount-of-air sensor for detecting the amount of air downstream of a throttle valve disposed in an intake pipe connected to said engine;
    means for calculating an amount of air commensurate with an amount of fuel to be supplied which corresponds to the degree of depression of the accelerator pedal, based on detected signals from said engine speed sensor and said accelerator pedal position sensor;
    means for calculating electric power to be supplied to said electric rotary machine, which corresponds to the difference between said commensurate amount of air and the amount of air detected by said amount-of-air sensor, when a value produced by subtracting the amount of air detected by said amount-of-air sensor from said commensurate amount of air is larger than a predetermined value;
    means for supplying the calculated electric power to said electric rotary machine;
    means for calculating an amount of fuel to be supplied which corresponds to the amount of air detected by said amount-of-air sensor, after said electric rotary machine is operated; and
    means for supplying said engine with said calculated amount of fuel.

2. A control system according to claim 1, wherein said engine uses gasoline as the fuel.

3. A control system according to claim 1, wherein said means for calculating electric power includes means for reducing electric power to be supplied to said electric rotary machine when the amount of air detected by said amount-of-air sensor is larger than said commensurate amount of air.

* * * * *